(12) United States Patent
Montague (10) Patent No.: US 6,415,555 B1
(45) Date of Patent: Jul. 9, 2002

(54) SYSTEM AND METHOD FOR ACCEPTING CUSTOMER ORDERS

(75) Inventor: Wayne Montague, Oak Brook, IL (US)

(73) Assignee: Restaurant Technology, Inc., Oak Brook, IL (US)

(*) Notice: Subject to any disclaimer, the term of this patent is extended or adjusted under 35 U.S.C. 154(b) by 0 days.

(21) Appl. No.: 09/560,304

(22) Filed: Apr. 27, 2000

(51) Int. Cl.[7] ................................................ G06F 15/21
(52) U.S. Cl. ................ 52/36.2; 52/36.1; 235/375; 235/383; 235/462.01; 354/333; 354/334; 354/342; 700/233; 700/236; 705/26; 705/27; 707/101; 707/102; 707/517
(58) Field of Search ............................ 52/36.1–36.5; 354/333, 334, 342; 235/462.01, 383, 375; 700/233, 236, 232, 238; 707/101, 102, 27, 517; 705/26, 27

(56) References Cited

U.S. PATENT DOCUMENTS

| | | | | |
|---|---|---|---|---|
| 6,014,137 A | * | 1/2000 | Burns | 345/334 |
| 6,058,373 A | * | 5/2000 | Blinn et al. | 705/26 |
| 6,078,848 A | * | 6/2000 | Berstein et al. | 700/237 |
| 6,101,483 A | * | 8/2000 | Petrovich et al. | 705/26 |
| 6,179,206 B1 | * | 1/2001 | Matsumori | 235/383 |

* cited by examiner

Primary Examiner—Carl D. Friedman
Assistant Examiner—Yvonne M. Horton
(74) Attorney, Agent, or Firm—Ryndak & Suri (57) ABSTRACT

A kiosk system and method is provided for accepting and processing customer orders and payments in a retail environment. The kiosk system and method is particularly applicable to the restaurant business and may include a consumer display screen for visually displaying product information of products that can be ordered at the kiosk, structure that is operable by the consumer for placing a consumer order composed of at least one product selected from products for which information is displayed on the consumer display screen and structure for accepting payment for the order from the consumer, which typically will include a cash payment by the consumer.

41 Claims, 6 Drawing Sheets

FIG.5

SYSTEM AND METHOD FOR ACCEPTING CUSTOMER ORDERS

FIELD OF THE INVENTION

The present invention relates to a method and system for accepting and processing consumer orders and payments in a retail environment. More specifically, the present invention relates to ordering technology in restaurants.

BACKGROUND OF THE INVENTION

The restaurant business is a labor-intensive business. The current labor market dictates high salaries for relatively unskilled positions. Additionally, staffing a restaurant is often an imprecise process based on past experience and one's prediction of future busy periods. This is exacerbated by the fact that busy periods requiring heavy staffing are often short, while an employee is often not willing to work for short shifts. Thus, there is a need for a system which allows for a more efficient use of one's staff and which allows the restaurant to balance its need for cost efficient staffing, sufficient staffing for busy periods, and the requirement that to retain quality employees one must be able to provide them with shifts of sufficient duration. Thus, there is a need for a system which automates the ordering process, thereby reducing labor costs and allowing for more efficient staffing of a restaurant.

However, the automated ordering system must also be accurate, efficient, fast and consumer friendly. Thus, there is also a need for an ordering system which improves the level of service in a restaurant at the same time it reduces overhead, and quickly and accurately receives and processes orders in restaurants.

Many customers expect fast and efficient service. While some customers want speed, other customers prefer to order at a more leisurely pace. Some customers may be discouraged from coming to a restaurant if they feel the process is too slow or other customers may be reluctant to frequent a restaurant if they feel bullied by others in a hurry to order or by register employees anxious to keep the order line moving. Thus, there is a need for a system which allows customers to order at their own pace, yet does not alienate customers. There is a need for a system which does not intimidate customers and is easy to use.

A need also exists for an improved kiosk which would be a cost efficient system for receiving and processing of customer orders, but which does not require specialized technology. The need exists for a kiosk system which is sufficiently inexpensive to operate and repair so that economically there could be a relatively large number of kiosks in a given locale for a single restaurant, thus, allowing customers to order at their own pace. The economic ability to have a large number of kiosks eliminates the frustration of customers who either must wait in line to order or who feel pressured to order more quickly.

There is a need for a system which allows consumers to order more efficiently. There is also a need for a system which streamlines the ordering process by allowing the consumer to select his most recent meal, his most common meal or to select a meal he has chosen in the past.

There is a need for a system which more efficiently and accurately takes orders. In the conventional quick service restaurants orders are given orally. There is a problem of miscommunications between the customer and the register employee. These miscommunications occur for any number of reasons including dialect or speech variances, hearing problems, mumbling and outside noise. The present invention eliminates mistakes due to miscommunication.

In a conventional system, a restaurant relies on its employees to sell complementary items or special deals. However, employees may not always remember to offer special deals or complementary items to the customer. Further, certain items are only available at particular times of the day. Thus, there is a need for a system which only offers items for sale when they are available and automatically offers complementary items and special deals.

In a conventional quick service restaurant, a customer waits in line for his food. Thus, there is a need for a system which eliminates the need for a customer to wait in line while his food is being prepared even though the food preparation time may be relatively short.

In a conventional quick service restaurant, the consumer reviews a menu board prior to making his selection. Almost half of Americans need corrective eyewear, thus, many customers cannot see the menu board clearly. Further, in many situations the customer must look for the information he wants. For example, the menus do not display nutrition information, and often time limits and other information is not easily identified on the board. Thus, there is a need for a system which makes the menu easier to access for the consumer. The present invention anticipates these problems and allows customers to view the menu at the ordering kiosk. Information is also provided audibly through its directional speaker.

In the conventional quick service restaurant, there is no way to track the habits of a particular customer. Knowing a customer's ordering habits makes it easier to service an individual customer. Thus, there is a need for a system which allows for more efficient service to individual customers.

SUMMARY OF THE INVENTION

The present invention allows for automated ordering by customers in a retail environment. One use of the present invention would be by a quick service restaurant.

In one embodiment of the present invention a kiosk for consumer ordering is located in the retail environment. The kiosk may be located inside or outside of the establishment it is associated with. For example, the kiosk might be located within a quick service restaurant or the kiosk might be located in the parking lot area outside the restaurant. The kiosk might also be located in or near a food court area such as may be found in malls, airports or amusement parks. In another embodiment, the kiosk could be located near an entrance of a retail environment, such as the entrance to a mall or amusement park.

In one embodiment of the present invention, the kiosk is for customer use. The customer places his order and pays for his order at the kiosk. In accordance with one aspect of the present invention an automated system is provided for accepting consumer orders. In accordance with one aspect of the present invention an automated system is provided for accepting consumer payments. In accordance with one aspect of the present invention, the present invention allows for consumers to enter their own orders.

In one embodiment of the present invention, the kiosk display screen has a series of menus and sub-menus which allow the customer to view information about the products for sale. In one embodiment of the present invention, the initial menu screen of the kiosk is displayed after a transaction is completed, when there has been no input for a designated period of time, or upon touch of a "new order" panel on the touch sensitive display screen.

The display consists of a touch screen allowing the consumer to move through a series of menus and sub-menus. Each screen shows at least one product or product category which the consumer has the opportunity to order. In one embodiment, the customer has the opportunity to select a product category, such as drinks, sandwiches, desserts and select the items he wants from that category.

In one embodiment of the present invention, the display screens are touch sensitive. In one embodiment, when the customer touches a particular item on the screen, it is added to his order. In another embodiment of the present invention, when the customer touches a particular item on the display screen, further information about the product, such as nutrition information is displayed. In one embodiment of the present invention, the first menu of the kiosk displays information about the product categories that are for sale. When a customer selects a product category by touching that category on the touch sensitive screen, another menu listing items in that product category may be displayed. The customer then orders an item by touching that item on the touch sensitive screen. Once he does so, the item is added to his order. A sub-screen will be displayed if the customer has an additional choice to make for that item. For example, a customer who orders a soft drink will need to select the size of the drink. To do this the customer touches the appropriate size on the touch sensitive screen. A sub-menu will also be displayed if the customer selects an item which is part of a special promotion. The customer will have the option of ordering the item as part of the promotion by touching the appropriate item on the touch sensitive screen. Once the customer has completed the choices needed to order an item, a sub-menu is displayed offering complementary items, such as a drink with a sandwich. The customer can then select a complementary item by touching the complementary item on the touch sensitive screen. In one embodiment, the customer is also provided a sub-menu for special orders, such as leaving a particular topping off of an item.

In one embodiment of the present invention, a real-time list of the ordered items is displayed at all times, a real-time display of the cost for these items and the current total is displayed, as is an area with a number of choices the customer has relating to his order. The customer has the option of completing the order, canceling the order, or changing the order. When the customer completes his order, a sub-menu is displayed asking if the customer has any coupons, gift certificates, or other similar discounts or promotions. The kiosk is equipped with a system for addressing discounts. In one embodiment, a bar code reader is employed. In another embodiment, an employee is available to authorize the discount.

In one embodiment of the present invention, the kiosk can identify a customer's past orders. In one embodiment, the kiosk reads information stored on a frequent customer card inserted by the customer. The kiosk then displays a sub-menu which offers the customer the choice of selecting his "regular" or most frequent order. The sub-menu also allows the customer the choice of selecting an order identical to one the customer has ordered in the past and lists prior orders or the choice of ordering from the menu.

In one embodiment, the customer is given the option of completing his order and joining it with other orders, so that all the food for a group of customers will be available at the same time. The individuals in the group, such as a team, may pay for their orders individually or the orders may be combined and one person from the group, such as a family, pays for all the orders at the end of the transaction. Each person in the group receives his own order, thus, eliminating the need to sort out who ordered what once the group is ready to eat.

In one embodiment, the customer is given the option of selecting a time he wants his order to be ready. For example, a family goes to the amusement park. On the way in to the park they could order and request that their meal be ready at a particular time. The family could then regroup at mealtime. By ordering early, the customer ensures his meal will be ready at the time he wants to eat. This could eliminate a crush of people at the food court at the same time. In another embodiment, the customer will be informed if the time the customer has selected is extremely busy and offered alternate times that the customer may prefer.

In one embodiment of the kiosk, in addition to the touch sensitive screen displaying information about the products and the order, there is a directional speaker above the kiosk. The directional speaker is aimed where a customer using the kiosk would stand. The directional speaker allows a customer standing in front of the kiosk in the ordering position to hear what is being said. However, someone who is not in the ordering position would not be able to understand what is being said. This allows customers a degree of privacy while they are placing their orders. It also allows those nearby to concentrate on their own ordering, conversation or activity without becoming distracted. In addition, it allows customers to pay for their orders without information about the amount paid or the amount of change due being broadcast to others.

In one embodiment of the present invention, the kiosk accepts payment by the customer for the order. In one embodiment, the kiosk accepts cash payments (e.g., currency in the form of dollars) and the kiosk may or may not provide change. In another embodiment, the kiosk accepts credit or debit cards as payment. In yet another embodiment, the kiosk accepts coupons, gift certificates, or other discounts as payment or partial payment.

In another embodiment of the present invention, the customer is provided with change by the kiosk which can be cash or credit card credit. In another embodiment, the customer is provided with change by a register employee. The register employee may be stationed near the kiosks or the register employee may be stationed near the area where the customer will pick-up his order. In yet another embodiment, an employee brings the customer his change along with his meal, such as where the customer is seated, for example.

In one embodiment of the present invention, when the customer has completed his order and paid for his order, the order is transmitted electronically to the order production facility. The production facility may be the kitchen in a quick service restaurant where food is cooked or it might be the bagging area where the order is prepared. At the same time, the amount paid and the amount of change due is transmitted electronically to a register employee.

After the customer has completed his order and paid for his order, he is provided a code for receiving his meal. The code is transmitted electronically to the order production facility, such as the kitchen, and to the register employee.

In one embodiment, the code is a number on the customer's receipt. In another, the customer is instructed as to what the code for his order is. He then is instructed to take a ticket or other identifier containing the corresponding code or may receive it from an employee or the kiosk.

In another embodiment, the customer provides his code to the register employee to receive the corresponding order and any change he may be due. In another embodiment of the present invention, the customer sits at a table and waits for his order to be delivered. The identifier containing the code is placed on the table by the customer where it could be seen by an employee. The employee then identifies the customer based on the code and delivers to the customer the corresponding order and any change the customer is due.

In accordance with one aspect of the invention, a kiosk making use of a personal computer permits a restaurant to economically have a large number of kiosks. Further, there would be minimal down-time if a kiosk experienced technical difficulties because a personal computer could be swapped for another personal computer in a short time, such as a matter of minutes.

In one embodiment of the invention, the kiosk can be opened from the back. There is a cabinet, which may contain a shelf which may be a sliding shelf, onto which a conventional personal computer may be placed.

The kiosk system may be run using a conventional personal computer. A single personal computer or computers may operate a plurality of kiosks, which kiosks may be located at a single location or restaurant. A personal computer is advantageous as they are inexpensive to purchase, repair and replace. Additionally, they are relatively fungible and a new personal computer can be used while the current personal computer is being serviced. This eliminates the amount of unusable time when a kiosk is being repaired.

DETAILED DESCRIPTION OF THE INVENTION

Figure 1:
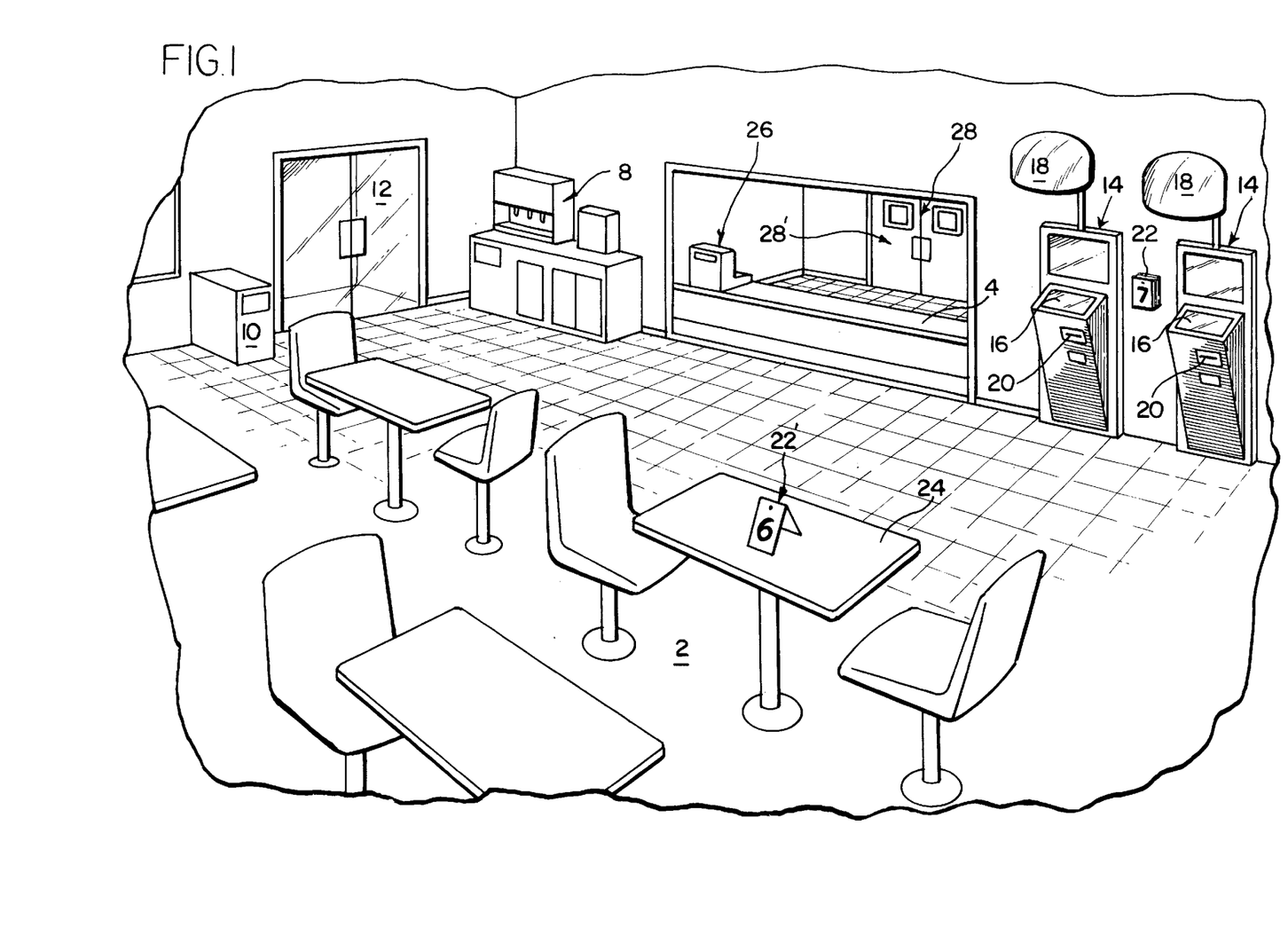
FIG. 1 illustrates a partial view of the interior of a quick service restaurant.

Referring to FIG. 1, a portion of the interior of a quick service restaurant is illustrated. It includes an access to a seating area 2, a counter 4, a universal drink dispersing station 8, a trash receptacle 10, an entrance 12, a cash register 26, access 28 through doors 28' to an order preparation area located behind doors 28'. FIG. 1 also depicts a kiosk 14. Kiosk 14 is used by the customer (not shown) for ordering and for making payments. Kiosk 14 includes a touch sensitive screen 16, an audio speaker which in this case is a directional speaker 18, and a payment acceptor 20. Payment acceptor 20 accepts cash, but also may accept debit or credit cards.

To operate kiosk 14, the customer (not shown) would physically approach kiosk 14. At kiosk 14, he would select his meal from the menus and sub-menus that are displaced on the screen 16 by using the touch sensitive screen 16, examples of which are hereafter described. Information is provided to the consumer visually on touch sensitive screen 16 and audibly from directional speaker 18. The customer may also be queried and respond appropriately as to whether the order is a take-out order or an in restaurant order.

When the customer has completed his order he inserts cash money (not shown), a credit or debit card (not shown) or other suitable form of payment (not shown) into payment acceptor 20.

The customer is then instructed visually on touch sensitive screen 16 and/or audibly through speaker 18 of customer's applicable order code 22, which in this case is number 6. The customer is instructed to take an identifier card containing an order code, which may be a number (e.g. "6" as shown in FIG. 1), which is in the form of a free-standing card. The customer places identifier card 22' containing the order code on his table 24 or may present the identifier containing the order code at the counter 4. If the identifier with the order code is placed on table 24, the customer is brought the order (not shown) corresponding to order code 22 on the identifier card. Alternatively, the customer could receive a printed order code identifier card or similar hard copy indicia bearing article that is printed at kiosk 14.

Figure 2:
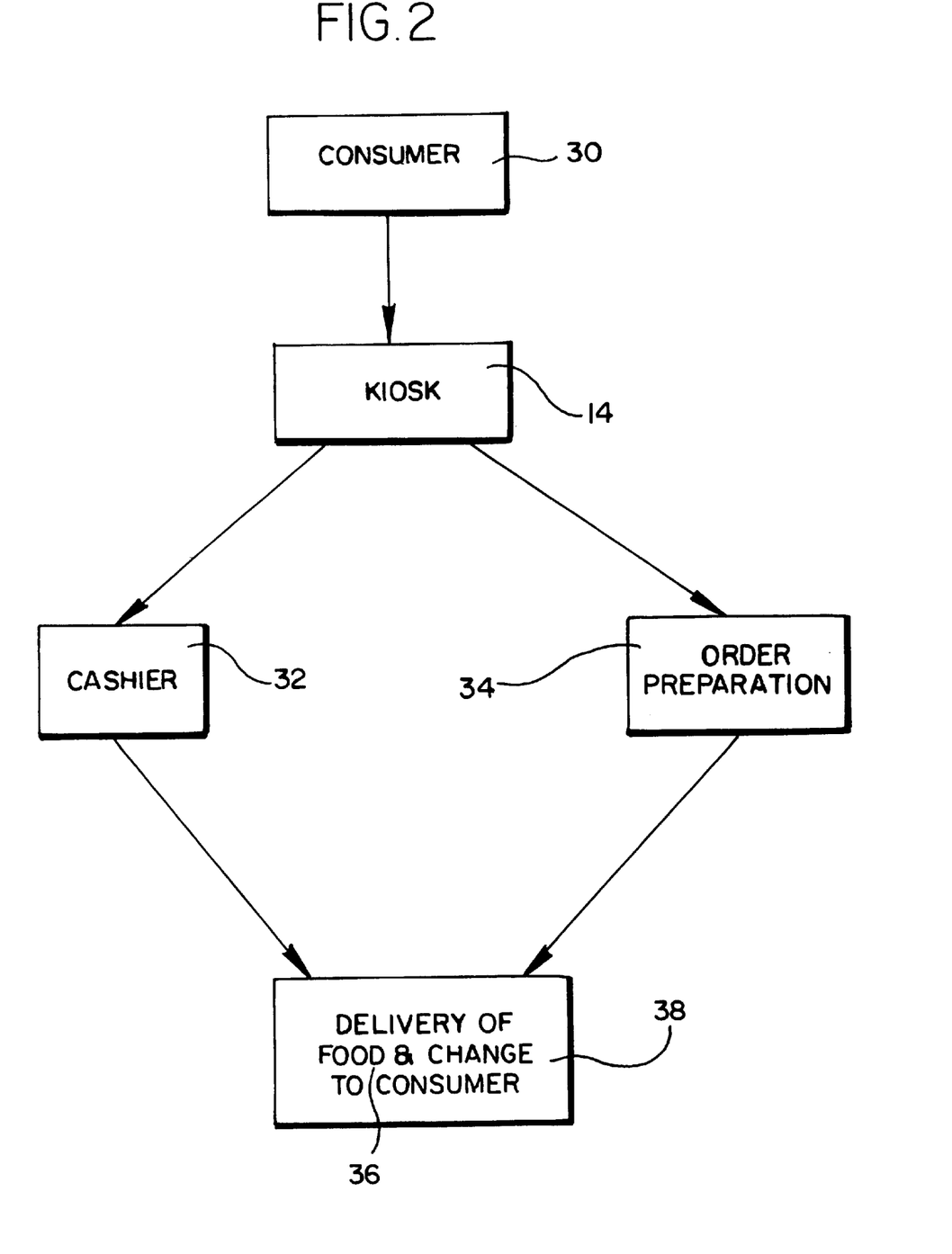
FIG. 2 illustrates schematically the flow of information to and from a kiosk in accordance with the invention.

FIG. 2 depicts the flow of information from kiosk 14. A consumer 30 inputs his order into the kiosk 14. This may be done manually through the use of touch sensitive screen 16. Consumer 30 inputs his payment into kiosk 14. Once payment is received the price of the order, the amount tendered, and the change due are transmitted to cashier 32. Simultaneously, the order and order code are sent to the order preparation area 34 where the order is assembled. The assembled order 36 and the change 38 are provided to consumer 30.

Figure 3:
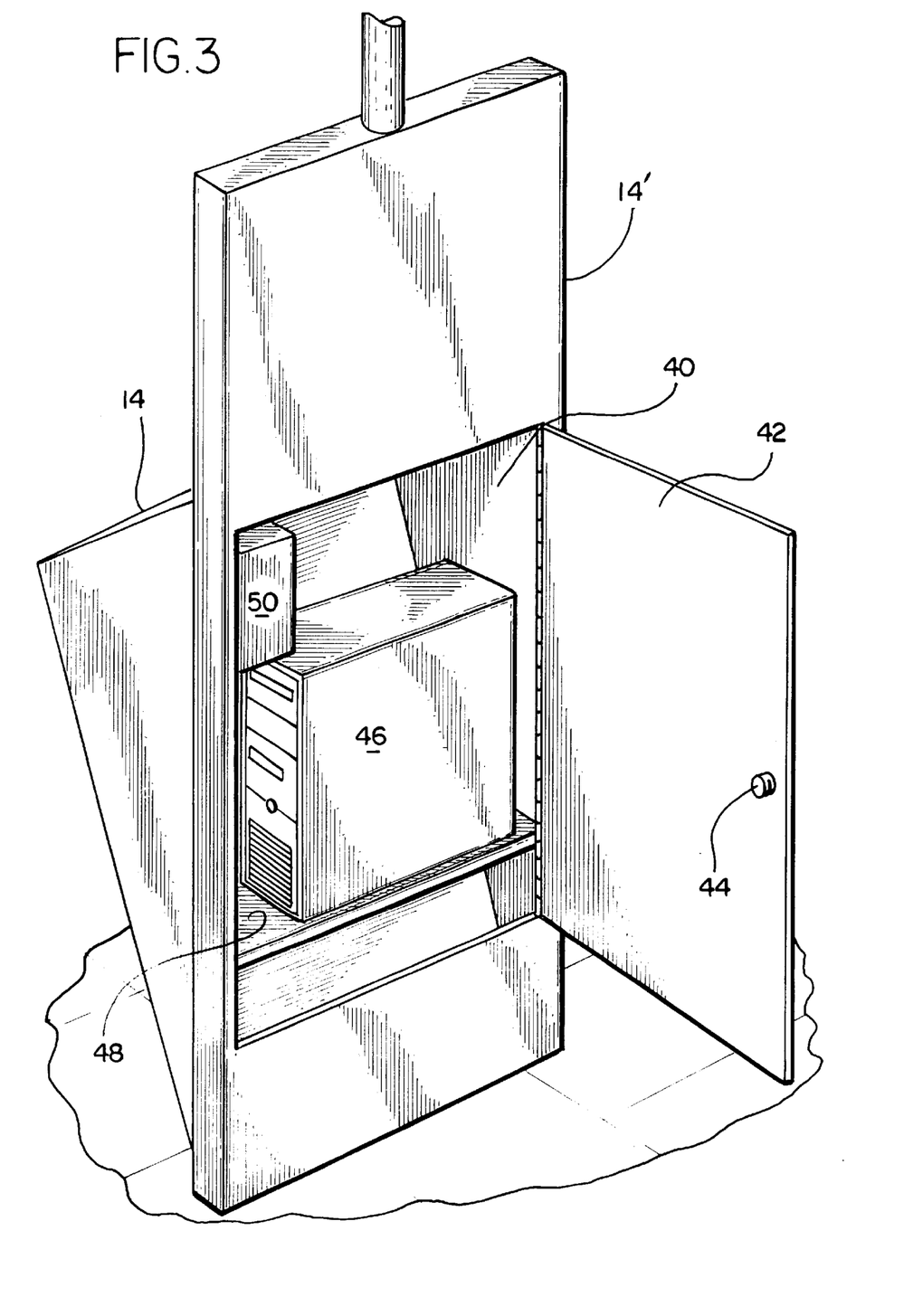
FIG. 3 illustrates an elevation view of the inside of the back of the kiosk of FIG. 2.

FIG. 3 depicts the rear elevation view of the kiosk 14. The kiosk 14 has an opening 40. The opening may be closed with a door 42. Door 42 may be locked closed with a lock 44. Located within kiosk 14 through opening 40 is a personal computer 46 which is used to operate kiosk 14. Personal computer 46 is located on a moveable shelf 48 which is constructed for sliding movement relative to cabinet 14' of kiosk 14. Moveable shelf 48 can be extended out of opening 40 by means of tracks (not shown) or other suitable structure for easier access to personal computer 46. The interior of kiosk 14 also houses a lock box 50 for holding payments and other hardware as desired.

Figure 4:
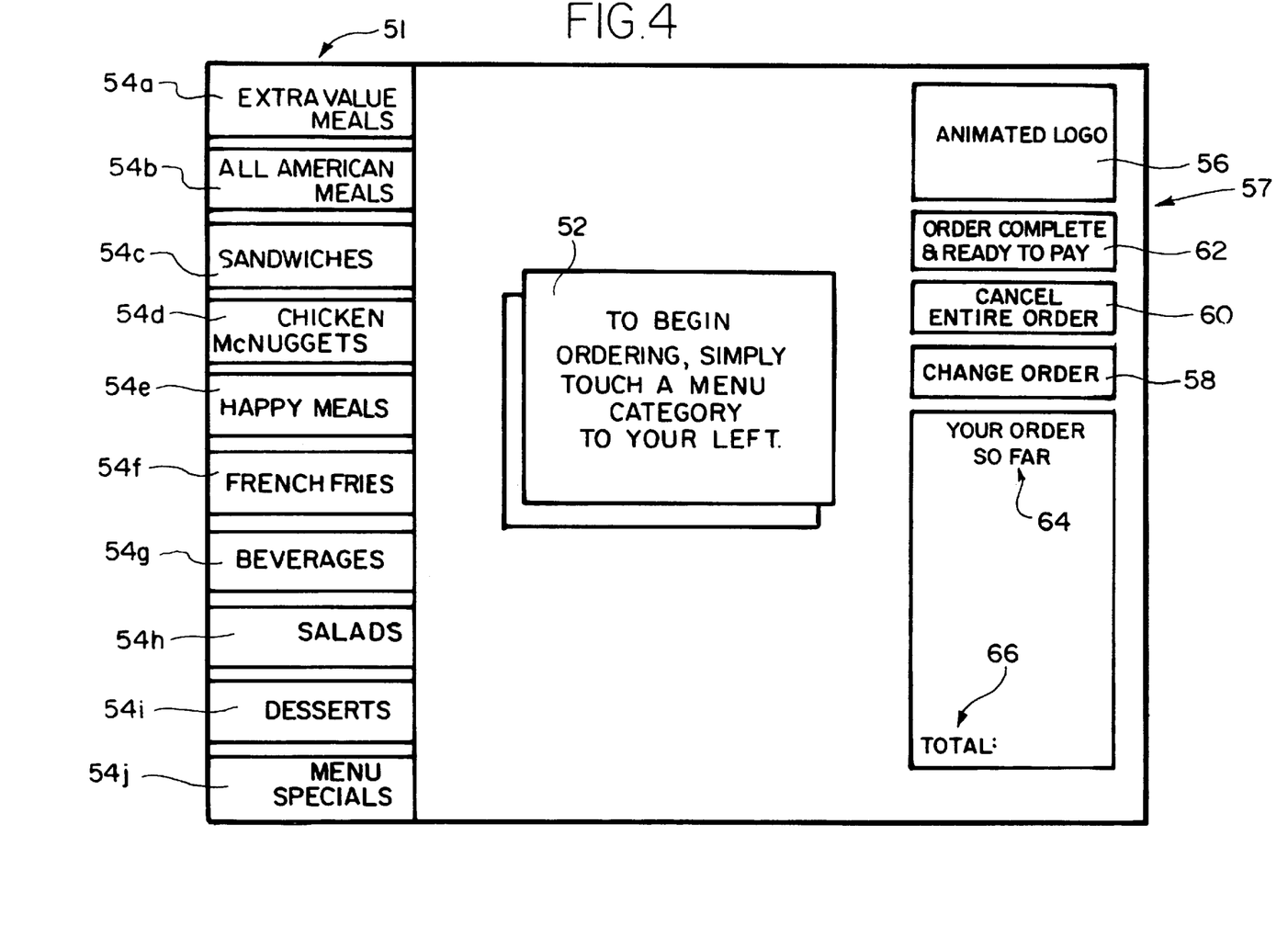
FIG. 4 illustrates an example of a menu screen that can be displayed at the kiosk of FIG. 2.

FIG. 4 depicts the initial menu 51. Initial menu 51 has an introductory panel 52. The initial menu also contains panels for each product category 54a–j. The menu has a panel for a logo 56. It also has panels 57 for changing an order 58, canceling an order 60, and completing an order 62. Finally, there is a status panel identifying the items ordered so far 64 and the current total 66.

A customer (not shown) selects a menu category by touching one of appropriate product category panels 54a–j.

Figure 5:
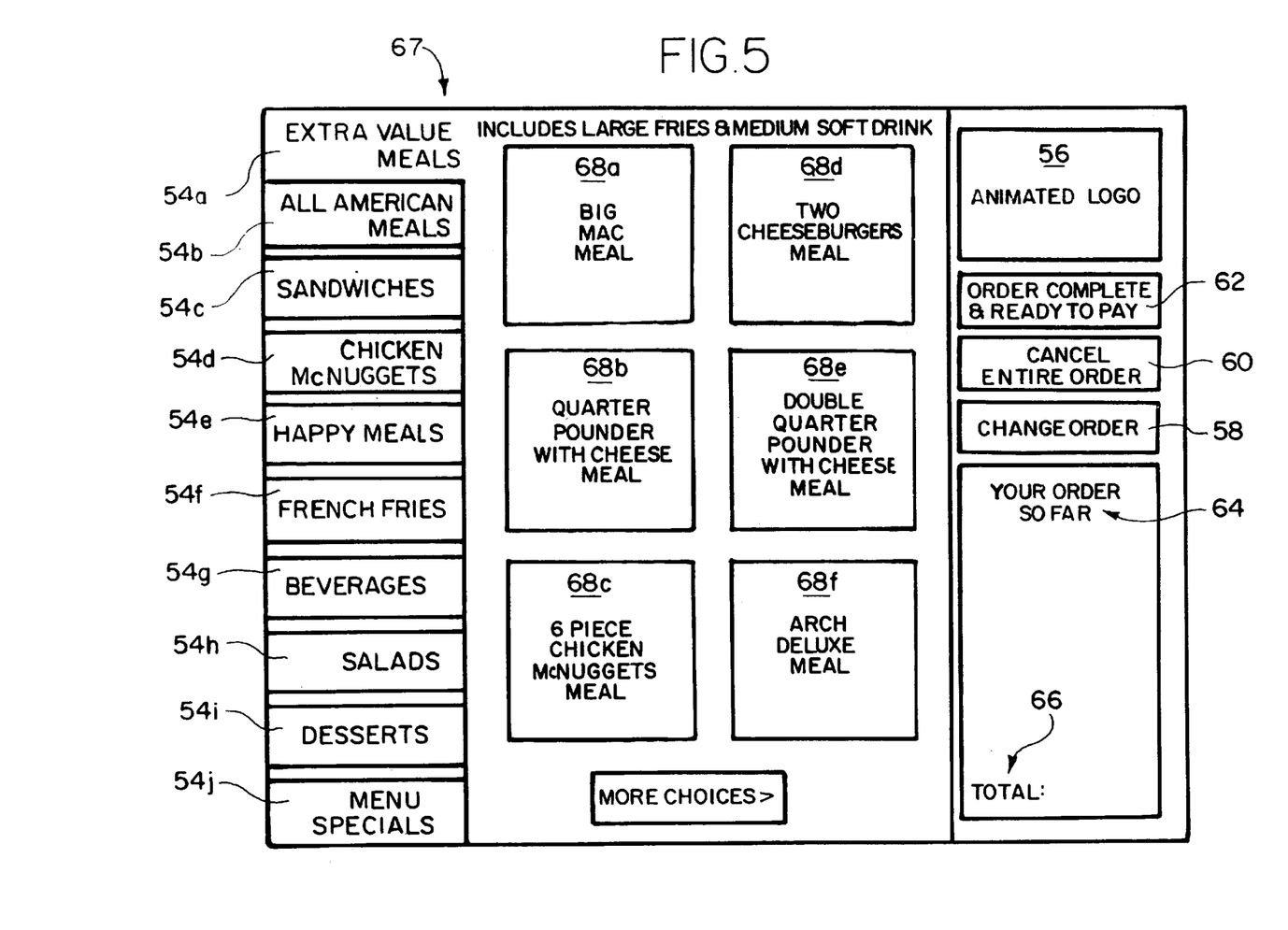
FIG. 5 illustrates an example of a sub-menu screen that can be displayed at the kiosk of FIG. 2.

FIG. 5 depicts a menu 67. Menu 67 has panels for each product 68a–f. Menu 67 displays the panels for each product in a product category after the customer (not shown) has selected a menu category by touching one of menu category panels 54a–j.

The customer selects a product by touching one of product panels 68a–f for a respective menu item. Each time the customer selects an order item (not shown), that item is listed in the order so far panel 64 and the current total 66, which may include any applicable tax as well. The menu has a panel for a logo 56. It also has panels for changing an order 58, canceling an order 60, and completing an order 62. Finally, there is a status panel identifying the items ordered so far 64 and the current total 66.

Figure 6:
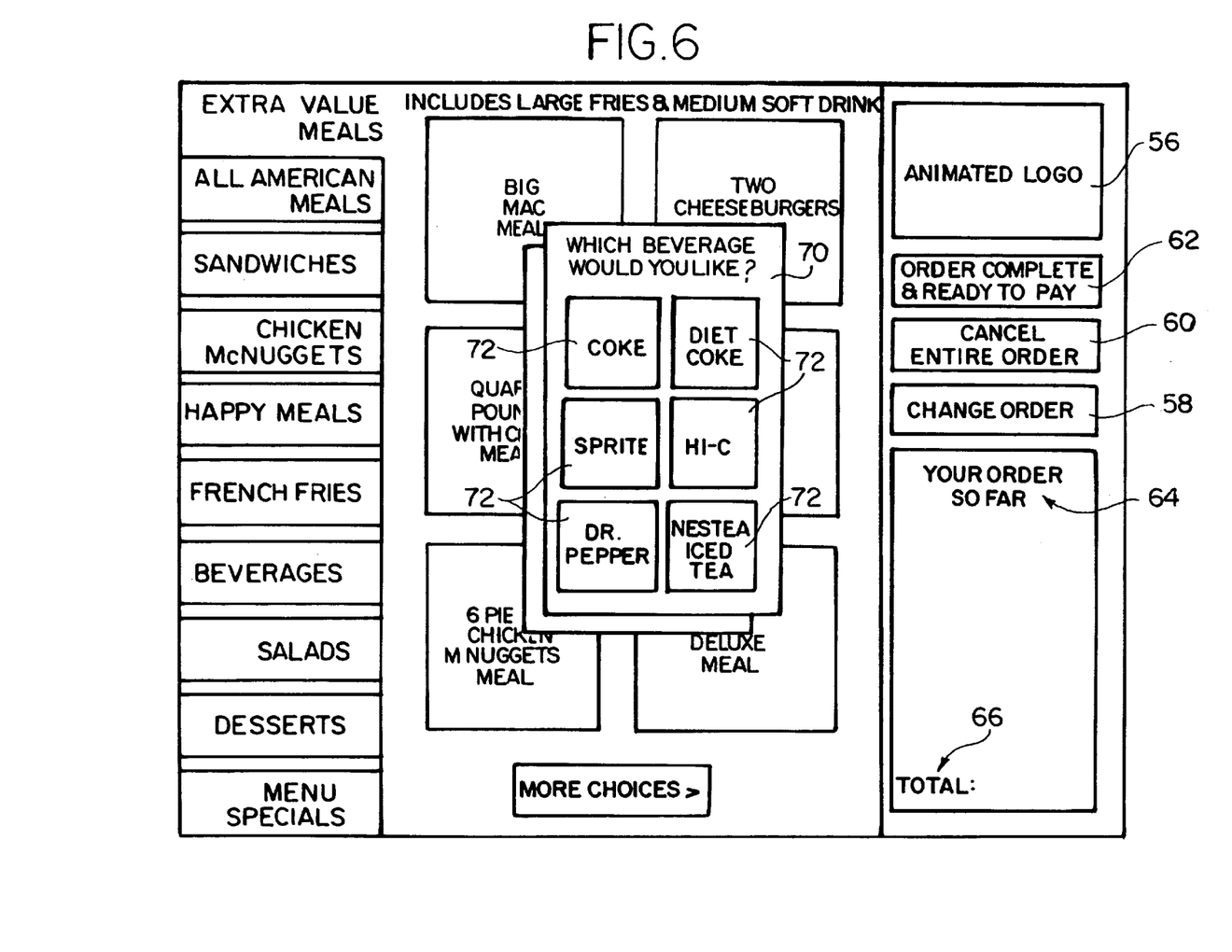
FIG. 6 illustrates another example of a sub-menu screen that can be displayed at the kiosk of FIG. 2.

FIG. 6 shows a sub-menu 70. The sub-menu 70 is displayed when there is additional information to display to the consumer. A sub-menu 70 may be displayed over a menu screen. A sub-menu 70 includes additional product selections 72 for the consumer to choose from. For example, a sub-menu 70 may also be displayed to offer complementary products (not shown); nutrition information (not shown); special promotions (not shown); special order data (not shown); or errors (not shown). The menu has a panel for a logo 56. It also has panels for changing an order 58, canceling an order 60, and completing an order 62. Finally, there is a status panel identifying the items ordered so far 64 and the current total 66.

Suitable software is resident on computer 46 for implementing the displays and functions previously described. Writing such software is well known to those skilled in the art and consequently is not described in detail herein.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

What is claimed is:

1. A kiosk for use by consumers in a retail environment comprising:
   a consumer display screen for visually displaying only product information of products currently available to be ordered from the kiosk for prompt delivery to the consumer;
   means operable by the consumer for placing a consumer order composed of at least one product selected from products for which information is displayed on the consumer display screen; and
   means for accepting payment for the order from the consumer.

2. The kiosk of claim 1 wherein the means for accepting payment accepts cash.

3. The kiosk of claim 1 wherein said display screen displays only currently available restaurant menu items.

4. The kiosk of claim 1 further comprising means for transmitting information for the consumer order placed by the consumer at the kiosk to an order production area.

5. The kiosk of claim 1 further comprising means for transmitting a consumer order placed by the consumer at the kiosk to a cashier terminal.

6. The kiosk of claim 4 wherein said means for transmitting the consumer order information does not transmit information the consumer order information until after receipt of payment by the consumer.

7. The kiosk of claim 1 further comprising means for reading a consumer data card provided by the consumer, said consumer data card having memory means containing historical order data on past orders of individual consumers, and order prompting means to prompt a consumer with an order suggestion based on data obtained from that consumer's order data card.

8. The kiosk of claim 1 further comprising means for providing audio information to the consumer while at the kiosk relating to available products.

9. The kiosk of claim 7 wherein said order prompting means comprises audio prompting means.

10. The kiosk of claim 1 wherein the means operable by the consumer comprises a touch sensitive screen.

11. The kiosk of claim 1 wherein the kiosk operates using a computer means for transmitting and receiving information where said computer means is a personal computer.

12. The kiosk of claim 1 wherein the means for accepting payment accepts gift certificates.

13. The kiosk of claim 1 wherein the means for accepting payment accepts coupons.

14. The kiosk of claim 1 further comprising an order prompting means to prompt a consumer with an order suggestion.

15. The kiosk of claim 14 wherein the order suggestion displays a menu special.

16. The kiosk of claim 14 wherein the order suggestion displays at least one additional menu item which complements the consumer order.

17. The kiosk of claim 14 herein the order suggestion displays a promotional item.

18. A kiosk for use by consumers in a retail environment comprising:
    a consumer display screen for visually displaying only product information on products currently available to be ordered from the kiosk for prompt delivery to the consumer;
    means operable by the consumer for placing a consumer order at the kiosk composed of at least one product selected from products for which information is displayed on the consumer display screen; and
    means for transmitting information on the consumer order placed by the consumer at the kiosk to an order production area.

19. The kiosk of claim 18 further comprising means for transmitting information on the consumer order to a cashier terminal.

20. The kiosk of claim 13 further comprising means for accepting cash payment from the consumer.

21. The kiosk of claim 13, further comprising a computer means for transmitting and receiving product, order, and payment information.

22. A method for automated ordering by consumers in a retail environment comprising:
    (a) displaying visually on a consumer display screen only product information about at least one product that is currently available to be ordered for prompt delivery to the consumer;
    (b) placing of a consumer order composed of at least one product selected from only the products that are currently available to be ordered; and
    (c) payment for the order.

23. The method of claim 22 further comprising displaying visually on a display screen only restaurant items that are currently available to be ordered by the consumer for prompt delivery to the consumer.

24. The method of claim 22 further comprising:
    (a) displaying visually on a display screen menus containing only categories of restaurant items that are currently available to be ordered for prompt delivery to the consumer;
    (b) displaying visually on a display screen sub-menus of additional choices to complete the order;
    (c) displaying visually on a display screen sub-menus containing additional menu items which complement the items ordered by the consumer;
    (d) displaying visually on a display screen sub-menus containing menu specials; and
    (e) displaying visually on a display screen sub-menus containing nutrition information about the menu items, wherein each of the displayed menu items are currently available for prompt delivery to the consumer.

25. The method of claim 22 further comprising touching of a touch sensitive screen by the consumer to select an item and electronically adding that item to the order.

26. The method of claim 22 further comprising:

(a) inserting a consumer data card into the kiosk by the consumer;
(b) electronically reading the consumer data card;
(c) offering the consumer the option of ordering the same thing he has ordered in the past;
(d) selecting the order by the consumer;
(e) transmitting the order; and
(f) storing data about the current order on the consumer data card.

27. The method of claim 22 further comprising transmitting the order to the order production area after the consumer has paid for the order.

28. The method of claim 22 further comprising accepting cash payment from the consumer for the order by the kiosk.

29. The method of claim 22 further comprising accepting a payment means other than cash by the kiosk.

30. The method of claim 22 further comprising accepting a coupon or discount as at least partial payment for the order.

31. The method of claim 22 further comprising transmitting the order to the cashier terminal.

32. The method of claim 22 further comprising providing the consumer with change.

33. The method of claim 32 further comprising providing change to the consumer by a register employee.

34. The method of claim 32 further comprising providing change to the consumer from the kiosk.

35. The method of claim 22, further comprising acquiring the order by the consumer.

36. The method of claim 35 further comprising providing the consumer with an order code.

37. The method of claim 36 further comprising locating the order code by the retail personnel and bringing the corresponding order to the consumer.

38. The method of claim 36 further comprising providing of the order code by the consumer to the register employee and receiving the corresponding order.

39. The method of claim 29 wherein the payment means is a gift certificate.

40. A kiosk for use by consumers in a retail environment comprising:
   a consumer display screen for visually displaying product information of products available to be ordered from the kiosk;
   means operable by the consumer for placing a consumer order composed of at least one product selected from products for which information is displayed on the consumer display screen; and
   means for accepting payment for the order from the consumer, wherein the means for accepting payment accepts cash.

41. A method for automated ordering by consumers in a retail environment comprising:
   (a) displaying visually on a consumer display screen product information about at least one product that is available to be ordered;
   (b) placing of a consumer order composed of at least one product selected from the products that are currently available to be ordered for prompt delivery to the consumer; and
   (c) accepting cash payment for the order by the kiosk.

* * * * *